United States Patent
Ha et al.

(10) Patent No.: US 11,223,203 B2
(45) Date of Patent: Jan. 11, 2022

(54) SYSTEM AND METHOD OF PREDICTING THE PRESENCE OF AN OUT-OF-STEP CONDITION IN A POWER SYSTEM

(71) Applicant: General Electric Technology GmbH, Baden (CH)

(72) Inventors: Hengxu Ha, Stafford (GB); Shiming Fang, Shandong (CN); Sankara Subramanian Sri Gopala Krishna Murthi, Stafford (GB)

(73) Assignee: General Electric Technology GmbH, Baden (CH)

( * ) Notice: Subject to any disclaimer, the term of this patent is extended or adjusted under 35 U.S.C. 154(b) by 605 days.

(21) Appl. No.: 16/074,801

(22) PCT Filed: Feb. 14, 2017

(86) PCT No.: PCT/EP2017/053321
§ 371 (c)(1),
(2) Date: Aug. 2, 2018

(87) PCT Pub. No.: WO2017/140690
PCT Pub. Date: Aug. 24, 2017

(65) Prior Publication Data
US 2019/0044339 A1 Feb. 7, 2019

(30) Foreign Application Priority Data

Feb. 18, 2016 (EP) .................................... 16275029

(51) Int. Cl.
*G06F 11/30* (2006.01)
*H02J 3/38* (2006.01)
(Continued)

(52) U.S. Cl.
CPC ............... *H02J 3/38* (2013.01); *G06F 11/30* (2013.01); *H02P 1/34* (2013.01); *H02P 9/14* (2013.01); *G05B 9/02* (2013.01); *H02J 2203/20* (2020.01)

(58) Field of Classification Search
CPC ............... H02J 3/38; G06F 11/30; H02P 1/34
(Continued)

(56) References Cited

U.S. PATENT DOCUMENTS

| | | | |
|---|---|---|---|
| 6,625,520 B1* | 9/2003 | Chen ........................ | H02J 3/00 700/286 |
| 2011/0022240 A1* | 1/2011 | Rajapaske ................. | H02J 3/24 700/287 |

(Continued)

OTHER PUBLICATIONS

European Search Report and Written Opinion dated Jul. 21, 2016 which was issued in connection with EP16275029.3 which was filed on Feb. 18, 2016.

(Continued)

*Primary Examiner* — Andre Pierre Louis
(74) *Attorney, Agent, or Firm* — Eversheds Sutherland (US) LLP (57) ABSTRACT

In the field of power system stability there is provided a method of predicting the presence of an out-of-step condition in a power system that includes a plurality of generators, the method including the steps of:
(a) obtaining a differential value ($\tilde{\delta}_{COI}^{k}$) between a rotor angle ($\delta_k$) of an individual one of the plurality of generators and an equivalent rotor angle ($\delta_{COI}^{k}$) of the centre of inertia of the remainder of the plurality of generators;
(b) processing the differential value ($\tilde{\delta}_{COI}^{k}$) to determine whether the differential value ($\tilde{\delta}_{COI}^{k}$) is predicted to reach a predefined reference threshold ($\delta_{threshold}$); and (Continued)

(c) predicting the presence of the out-of-step condition in the power system if the differential value ($\tilde{\delta}_{COI}^{k}$) is predicted to reach the predefined reference threshold ($\delta_{threshold}$).

12 Claims, 4 Drawing Sheets

(51) Int. Cl.
 *H02P 1/34* (2006.01)
 *H02P 9/14* (2006.01)
 *G05B 9/02* (2006.01)

(58) Field of Classification Search
 USPC .......................................................... 703/18
 See application file for complete search history.

(56) References Cited

U.S. PATENT DOCUMENTS

| | | |
|---|---|---|
| 2012/0123602 A1 | 5/2012 | Sun et al. |
| 2014/0032138 A1 | 1/2014 | Shrestha et al. |
| 2018/0017042 A1* | 1/2018 | Baun .......................... H02P 9/04 |
| 2018/0054058 A1* | 2/2018 | Kumagai .................. H02J 3/18 |

OTHER PUBLICATIONS

PCT Search Report and Written Opinion dated Apr. 20, 2017 which was issued in connection with PCT/EP2017/053321 which was filed on Feb. 14, 2017.

\* cited by examiner

SYSTEM AND METHOD OF PREDICTING THE PRESENCE OF AN OUT-OF-STEP CONDITION IN A POWER SYSTEM

TECHNICAL FIELD

This invention relates to a method of predicting the presence of an out-of-step condition in a power system.

BACKGROUND OF THE INVENTION

Power system stability is critical to the safe operation of such systems. One form of instability arises from an unstable oscillation between an individual generator within a power system and the remaining generators in the power system, and gives rise to the individual generator becoming out-of-step with the power system.

BRIEF DESCRIPTION OF THE INVENTION

According to an aspect of the invention there is provided a method of predicting the presence of an out-of-step condition in a power system, the power system including a plurality of generators, the method including the steps of:
  obtaining a differential value between a rotor angle of an individual one of the plurality of generators and an equivalent rotor angle of the centre of inertia of the remainder of the plurality of generators;
  processing the differential value to determine whether the differential value is predicted to reach a predefined reference threshold; and
  predicting the presence of the out-of-step condition in the power system if the differential value is predicted to reach the predefined reference threshold.

Obtaining a differential value establishes a dynamic equivalent of the power system which takes into account changes in power system topology and operation states, and so permits the detection and prediction of an out-of-step condition without the need to establish a dynamic mathematical model of the power system.

A reliance on such dynamic models is undesirable since they typically struggle to accurately reflect the physical characteristics of a power system in real time, especially when the power system suffers a number of cascading failures. As a consequence often both the dynamic models themselves and the parameters used therein are inaccurate, and so they give rise to significant errors and correspondingly poor performance in terms of the detection and prediction of an out-of-step condition.

In step (a) the equivalent rotor angle of the centre of inertia of the remainder of the plurality of generators is obtained by calculating a rotor angle of the centre of inertia for the whole of the power system and deducing from this the said equivalent rotor angle by considering the rotor angle of the said individual generator.

Optionally the rotor angle of the centre of inertia of the whole power system is calculated by a central control unit and thereafter transmitted to a local control unit of each generator, and each local control unit deduces from the calculated rotor angle of the centre of inertia of the whole power system the corresponding said equivalent rotor angle.

Such steps result in a reduced processing overhead and communication burden within the power system compared to having, e.g. a local control unit of each generator calculate the equivalent rotor angle of the centre of inertia of the remainder of the plurality of converters.

The central control unit may receive time-stamped data from each generator to permit calculation of the rotor angle of the centre of inertia of the whole power system and the calculated rotor angle of the centre of inertia of the whole system may be transmitted to the local control unit of each generator with a synchronous time stamp.

Such steps facilitate the distribution of data processing mentioned hereinabove by providing for the coordinated operation of the central control unit and the local control unit of each generator.

In a preferred embodiment of the invention step (b) of processing the differential value to determine whether the differential value is predicted to exceed a predefined reference threshold includes:
(d) detecting the level of fluctuation of obtained differential values; and
(e) fitting the obtained differential values to a curve if the level of fluctuation exceeds a fluctuation threshold.

Fitting the obtained differential values to a curve only if the level of fluctuation of the said obtained values exceeds a threshold usefully avoids subsequent steps if the obtained differential values are sufficiently smooth to indicate that no instability risk exists, i.e. an out-of-step condition will not presently arise.

Optionally step (d) of detecting the level of fluctuation of obtained differential values includes:
  establishing a coefficient of variation; and
  determining that the level of fluctuation has exceeded the fluctuation threshold when the coefficient of variation exceeds a predetermined threshold coefficient value.

Establishing a coefficient of variation desirably allows for a degree of control to be exercised over the time period, i.e. time window, over which the level of fluctuation is to be detected and assessed.

Step (e) of fitting the obtained differential values to a curve includes fitting the sampled obtained differential values to a curve using a Prony method.

Using the Prony method may include establishing an oscillation model of the power system having a rank which is determined by trial and error to minimise any error in the curve fitting.

Such steps, and in particular the use of a Prony method, are desirably able to make use of real-time obtained differential values and so permit practical use of the method of the invention in an online, i.e. in a fully-operational, power system.

In a further preferred embodiment of the invention step (b) of processing the differential value to determine whether the differential value is predicted to exceed a predefined reference threshold additionally includes:
(f) assessing the stability of obtained differential values; and
(g) predicting a future shape of the differential values curve if the stability of the obtained differential values is decreasing.

Predicting a future shape of the differential values curve only if the stability of the values is decreasing advantageously avoids the need to predict the said future shape if no out-of-step condition will ultimately arise.

Step (f) of assessing the stability of obtained differential values includes:
  decomposing each obtained differential value into a plurality of exponential polynomials having arbitrary amplitudes, phases, frequencies and decaying factors; and
  determining that the stability of the obtained differential values is decreasing if one or more of the decomposed exponential polynomials has a positive decay factor.

A consideration of such decay factors provides a reliable and repeatable way of identifying when the differential values are getting larger, and hence a reliable and repeatable way of identifying when a particular generator is becoming less stable, such that there is a risk of an out-of-step condition arising.

Optionally step (g) of predicting a future shape of the differential values curve includes:
  calculating a predicted trajectory of the differential values; and
  calculating the rate of change of the real-time measured trajectory of the differential values.

Each of the aforementioned steps helps to reliably predict future movement of the differential values curve.

The predicted trajectory and rate of change calculations may be carried out in respect of differential values obtained during a historical period.

Such a step helps, in each instance, to improve the accuracy with which, ultimately, movement of the differential values curve is predicted.

In a still further preferred embodiment of the invention step (c) of predicting the presence of the out-of-step condition in the power system if the differential value is predicted to reach the predefined reference threshold includes:
  comparing a calculated predicted differential value at a future point in time with the predefined reference threshold according to $$\tilde{\delta}_{COI}{}^k = \delta_k(t_p) - \delta_{COI}{}^k(t_p) \geq \delta_{threshold}$$

where,
  $\tilde{\delta}_{COI}{}^k$ is the predicted differential value at future point in time $t_p$;
  $\delta_k(t_p)$ is the rotor angle of individual generator k at time $t_p$;
  $\delta_{COI}{}^k(t_p)$ is the equivalent rotor angle of the centre of inertia of the remainder of the plurality of generators at time $t_p$; and
  $\delta_{threshold}$ is the reference threshold;
  comparing the sum of an initial differential value at an initial start time and a rotor speed integral between the initial start time and a future point in time with the predefined reference threshold according to $$\tilde{\delta}_{COI}{}^k(t_0) + \int_{t_0}^{t_p} [\omega^k(t) - \omega_{COI}{}^k(t)] dt \geq \delta_{threshold}$$

where,
  $\tilde{\delta}_{COI}{}^k$ is the differential value at an initial start time $t_0$;
  $\omega^k$ is the rotor speed of individual generator k;
  $\omega_{COI}{}^k$ is the average rotor speed of the centre of inertia of the remainder of the plurality of generators;
  $t_p$ is the future point in time; and
  $\delta_{threshold}$ is the reference threshold; and
  predicting the presence of an out-of-step condition if both the foregoing comparisons indicate that the reference threshold has been reached.

Carrying out the aforementioned comparisons with the predefined reference threshold reliably and repeatedly permits the prediction of an out-of-step condition.

BREIF DESCRIPTION OF THE DRAWINGS

There now follows a brief description of preferred embodiments of the invention, by way of non-limiting example, with reference being made to the following figures in which.

DETAILED DESCRIPTION

Figure 1:
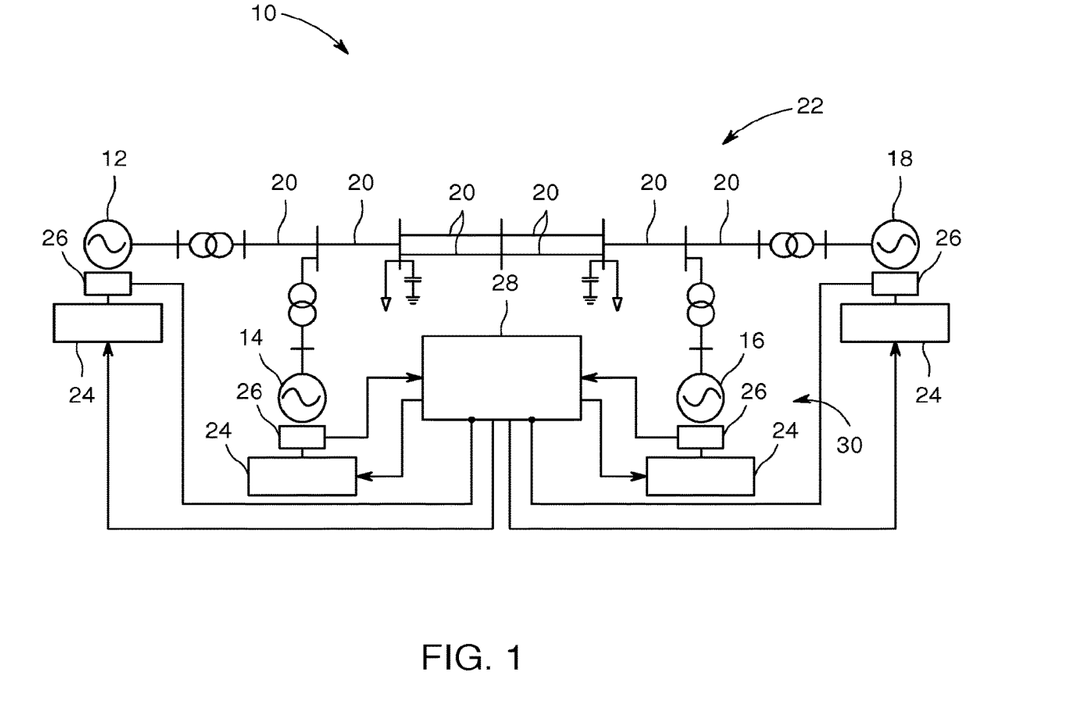
FIG. 1 shows an example power system including a plurality of generators in connection with which a method according to the invention is operable.

An example power system, in connection with which a method of predicting the presence of an out-of-step condition according to the invention is operable, is designated generally by reference numeral 10.

The power system 10 includes first, second, third and fourth generators 12, 14, 16, 18 that are interconnected with one another by various sections of power transmission medium 20 which together define a power transmission network 22.

Each generator 12, 14, 16, 18 includes a local control unit 24 which is operatively associated therewith and programmed to control the corresponding generator 12, 14, 16, 18. Each generator 12, 14, 16, 18 also includes a phasor measurement unit (PMU) 26 that directly provides, i.e. directly and synchronously measures, a rotor angle of the corresponding generator 12, 14, 16, 18.

Each of the aforementioned phasor measurement units 26 is arranged in communication with a central control unit 28 and thereby defines a wide-area measurement system (WAMS) 30. Each local control unit 24 is also arranged in communication with each phasor measurement unit 26 and the central control unit 28.

A method according to the invention of predicting the presence of an out-of-step condition in the power system 10 shown in FIG. 1 includes the steps of:
  obtaining a differential value $\tilde{\delta}_{COI}{}^k$ between a rotor angle $\delta_k$ of an individual generator k of interest (from the plurality of generators 12, 14, 16, 18 within the power system 10) and an equivalent rotor angle $\delta_{COI}{}^k$ of the centre of inertia of the remainder of the plurality of generators 12, 14, 16, 18;
  processing the differential value $\tilde{\delta}_{COI}{}^k$ to determine whether the differential value $\tilde{\delta}_{COI}{}^k$ is predicted to exceed a predefined reference threshold $\delta_{threshold}$; and
  predicting the presence of the out-of-step condition in the power system 10 if the differential value $\tilde{\delta}_{COI}{}^k$ is predicted to reach the predefined reference threshold $\delta_{threshold}$.

In step (a) of the method of the invention, the equivalent rotor angle $\delta_{COI}{}^k$ of the centre of inertia of the remainder of the plurality of generators 12, 14, 16, 18 is obtained by calculating a rotor angle $\delta_{COI}$ of the centre of inertia for the whole of the power system 10 and deducing from this the said equivalent rotor angle $\delta_{COI}{}^k$ by considering the rotor angle $\delta_k$ of the individual generator k of interest.

More particularly, the centre of inertia for the whole power system 10, including a whole system speed $\omega_{COI}$, the whole system rotor angle $\delta_{COI}$, and a whole system inertia $M_{sum}$, is calculated by the central control unit 28 according to the following:

$$\begin{cases} M_{sum} = \sum_{k=1}^{n} M_k \\ \omega_{COI} = \sum_{k=1}^{n} \frac{M_k \omega_k}{M_{sum}} \\ \delta_{COI} = \sum_{k=1}^{n} \frac{M_k \delta_k}{M_{sum}} \end{cases}$$

where,
- $M_k$ is the inertia of a given generator 12, 14, 16, 18;
- $\omega_k$ is the speed of a given generator 12, 14, 16, 18; and
- $\delta_k$ is the rotor angle of a given generator 12, 14, 16, 18, with,
each of the aforementioned individual inertias $M_k$, speeds $\omega_k$ and rotor angles $\delta_k$ of each generator 12, 14, 16, 18 being received, by the central control unit 28, as time-stamped data from each generator 12, 14, 16, 18, i.e. from the phasor measurement unit 26 of each generator 12, 14, 16, 18.

The calculated centre of inertia for the whole power system 10, i.e. the calculated whole system speed $\omega_{COI}$, whole system rotor angle $\delta_{COI}$, and whole system inertia $M_{sum}$, is then transmitted to each local control unit 24 with a synchronous time stamp.

Thereafter each local control unit 24 deduces from the centre of inertia for the whole power system 10 the corresponding equivalent rotor angle $\delta_{COI}^k$ of the centre of inertia of the remaining generators 12, 14, 16, 18 by considering the rotor angle $\delta_k$ of the corresponding generator 12, 14, 16, 18, and more particularly deduces the corresponding equivalent rotor angle $\delta_{COI}^k$ using the following equation:

$$\delta_{COI}^k = \delta_{COI} - \frac{\delta_k(\delta_k - \delta_{COI})}{M_{sum} - M_k}$$

where,
- $\delta_{COI}$ is the rotor angle of the centre of inertia of the whole power system 10, i.e. the whole system rotor angle;
- $\delta_k$ is the rotor angle of the corresponding generator 12, 14, 16, 18;
- $M_{sum}$ is the whole system inertia; and
- $M_k$ is the inertia of the corresponding generator 12, 14, 16, 18.

Thereafter a respective differential value $\tilde{\delta}_{COI}^k$ for a given generator k of interest is given by:

$$\tilde{\delta}_{COI}^k = \delta_k - \delta_{COI}^k$$

Figure 2:
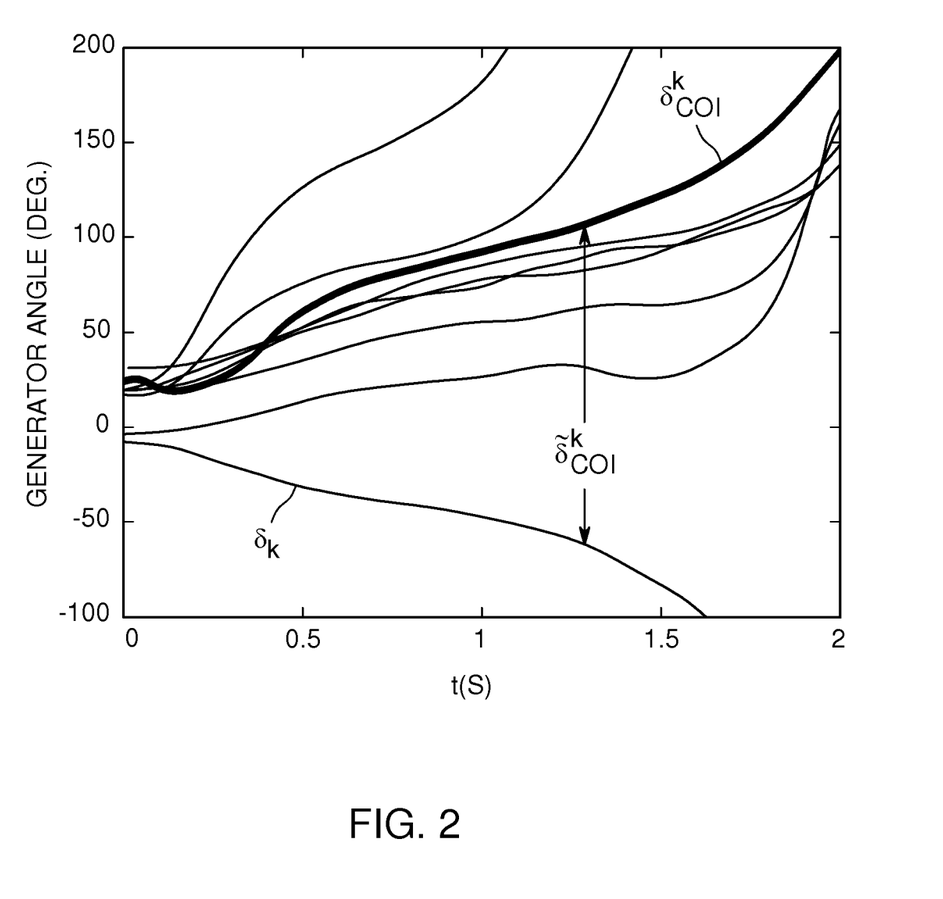
FIG. 2 illustrates how the rotor angle of an individual generator of interest varies compared to an equivalent rotor angle of the centre of inertia of the remainder of the plurality of generators shown in FIG. 1.

FIG. 2 illustrates, by way of example, how the differential value $\tilde{\delta}_{COI}^k$ for a given generator k varies as the rotor angle $\delta_k$ of the generator itself varies together with the corresponding equivalent rotor angle $\delta_{COI}^k$.

Thereafter, step (b) of processing the differential value $\tilde{\delta}_{COI}^k$ to determine whether the differential value $\tilde{\delta}_{COI}^k$ is predicted to exceed a predefined reference threshold $\delta_{threshold}$ includes each respective local control unit 24:

(d) detecting the level of fluctuation of obtained differential values $\tilde{\delta}_{COI}^k$;
(e) fitting the obtained differential values $\tilde{\delta}_{COI}^k$ to a differential values curve 32 if the level of fluctuation exceeds a fluctuation threshold;
(f) assessing the stability of obtained differential values; and
(g) predicting a future shape of the differential values curve 32 if the stability of the obtained differential values $\tilde{\delta}_{COI}^k$ is decreasing.

Figure 3:
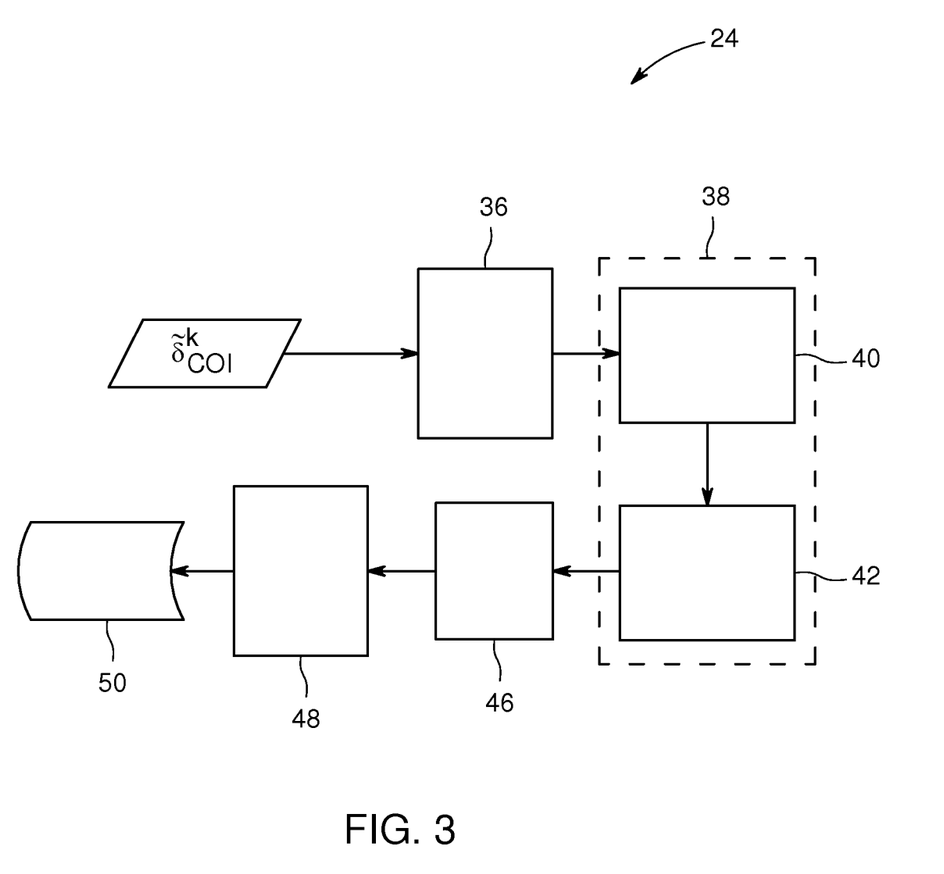
FIG. 3 illustrates various steps in the method of the invention.

The foregoing steps are illustrated schematically in FIG. 3 and are described in more detail hereinbelow.

Step (d) of detecting the level of fluctuation of obtained differential values $\tilde{\delta}_{COI}^k$ includes:
- establishing a coefficient of variation $C_V$; and
- determining that the level of fluctuation has exceeded the fluctuation threshold when the coefficient of variation $C_V$ exceeds a predetermined threshold coefficient value.

A fluctuation detection block 36 establishes a coefficient of variation $C_V$ according to $$C_V = \left| \frac{\sqrt{\sum_{m=n-N+1}^{n} (\tilde{\delta}_{COI}^k(m) - A)^2 / N}}{A} \right|$$

where,
N is number of samples in a time window of interest having a given duration; and A is the average value of the differential value $\tilde{\delta}_{COI}^k$ in the time window, with A being given by $$A = \sum_{m=n-N+1}^{n} \tilde{\delta}_{COI}^k(m) / N$$

With respect to the time window, if the number of samples is selected to be 200 then the duration, i.e. the length, of the time window is determined by dividing the number of samples by a chosen sampling time interval, e.g. 10 ms, i.e. to give a time window of 200 ms or 2 seconds.

Figure 4:
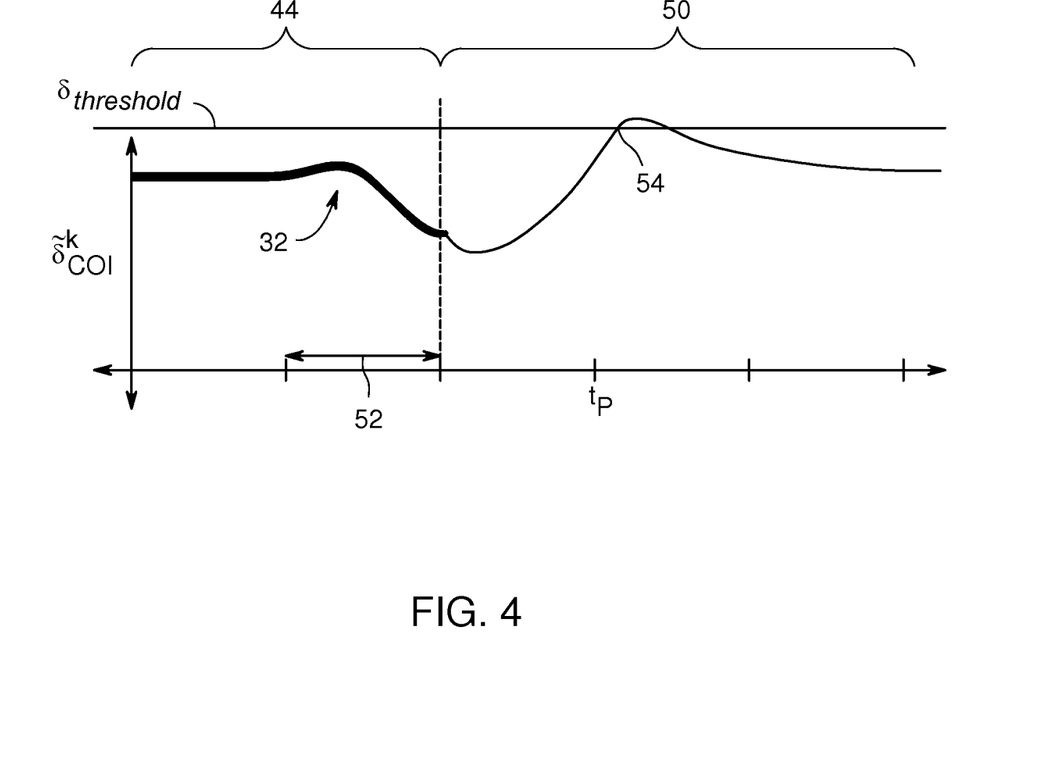
FIG. 4 illustrates schematically how an out-of-step condition is predicted according to the method of the invention.

In this manner the time window can be used to define a historical period 52, within a first portion 44 of a differential values curve 32 as shown in FIG. 4, over which the level of fluctuation of obtained differential values $\tilde{\delta}_{COI}^k$ is to be detected and assessed.

If the coefficient of variation $C_V$ of the sampled obtained differential values $\tilde{\delta}_{COI}^k$ exceeds a threshold coefficient value, which is set at 0.05, then the fluctuation detection block 36 indicates that the level of fluctuation has exceeded the fluctuation threshold and the local control unit 24 proceeds to step (e) of fitting the sampled obtained differential values $\tilde{\delta}_{COI}^k$ to a differential values curve 32, e.g. as shown schematically in FIG. 4.

Such curve fitting is carried out by a fitting block 38 within each local controller 24 that implements a Prony method. The Prony method firstly, by way of a trial and error sub-block 40, establishes an oscillation model of the power system 10 that has a rank which is determined by trial and error to minimise any error in the curve fitting. Then secondly, and by way of a curve fitting sub-block 42, the Prony method fits the sampled obtained differential values $\tilde{\delta}_{COI}^k$ to a differential values curve 32. This gives rise to a first portion 44 of the differential values curve 32 which is based on sampled measured data, i.e. sampled measured individual speeds $\omega_k$ and rotor angles $\delta_k$ of each generator 12, 14, 16, 18 obtained by the phasor measurement unit 26 of each generator 12, 14, 16, 18.

Thereafter, a stability assessment block 46 within each local control unit 24 carries out step (f) of assessing the stability of the sampled obtained differential values $\tilde{\delta}_{COI}^k$. Each stability assessment block 46 does this by decomposing each sampled obtained differential value $\tilde{\delta}_{COI}^k$ into a plurality, e.g. a number n, of exponential polynomials which have arbitrary amplitudes $A_i$, phases $\theta_i$, frequencies $f_i$ and decaying factors $\alpha$, i.e. according to $$\hat{y}(t) = \sum_{i=1}^{n} A_i e^{\alpha_i t_i} \cdot \cos(j2\pi f_i t + \theta_i)$$

The stability assessment block 46 then determines that the stability of the sampled obtained differential values $\tilde{\delta}_{COI}^k$ is decreasing, i.e. instability is increasing such that there is a risk of an out-of-step condition arising if one or more (but not all) of the decomposed exponential polynomials has a positive exponential decay factora, i.e. a positive exponential decay factor or a positive oscillation decay factor.

If the stability assessment block 46 makes such a decreasing stability determination then a subsequent prediction block 48 within each local control unit 24 predicts a future shape of the differential values curve 32, and so gives rise to a second portion 50 of the differential values curve 32 which is based on predicted values, i.e. as shown in FIG. 4.

The prediction block 48 predicts the future shape of the differential values curve 32, i.e. predicts the configuration of the second portion 50 of the differential values curve 32, by
calculating a predicted trajectory of the differential values $\tilde{\delta}_{COI}^{k}$; and
calculating the rate of change of the real-time measured trajectory of the differential values $\tilde{\delta}_{COI}^{k}$.

In each instance the predicted trajectory and rate of change calculations are carried out in respect of differential values $\tilde{\delta}_{COI}^{k}$ obtained during the aforementioned historical period 52 within the first portion 44 of the differential values curve 32, which are all based on measured data. In the example embodiment shown, the historical period 52 lasts for 2 seconds before prediction of the future shape of the differential values curve 32 begins.

More particularly the prediction block 48 first determines using Prony's method all of the coefficients, i.e. the arbitrary amplitudes $A_i$, phases $\delta_i$, frequencies $f_i$ and decaying factors $\alpha_i$ in the exponential polynomial set out above, i.e.

$$\hat{y}(t) = \sum_{i=1}^{n} A_i e^{\alpha_i t_i} \cdot \cos(j2\pi f_i t + \theta_i)$$

so that the exponential polynomial can then be used to express the predicted differential value curve 32, with the value of the curve 32 at any time in the future being obtained by substituting that time into the said polynomial equation.

Once the future shape of the differential values curve 32 has been established for a particular generator 12, 14, 16, 18 of interest, i.e. the second, predicted portion 50 has been established for a particular generator 12, 14, 16, 18, the corresponding local control unit 24 implements step (c) of predicting the presence of the out-of-step condition in the power system 10 firstly by comparing a calculated predicted differential value $\tilde{\delta}_{COI}^{k}$ at a future point in time $t_p$ with the predefined reference threshold $\delta_{threhold}$ according to:

$$\tilde{\delta}_{COI}^{k} = \delta_k(t_p) - \delta_{COI}^{k}(t_p) \geq \delta_{threshold}$$

where,
$\tilde{\delta}_{COI}^{k}$ is the predicted differential value at future point in time $t_p$, i.e. some future point in time up to which the predicted differential value is of interest;
$\delta_k(t_p)$ is the rotor angle of individual generator k at time $t_p$;
$\delta_{COI}^{k}(t_p)$ is the equivalent rotor angle of the centre of inertia of the remainder of the plurality of generators at time $t_p$; and
$\delta_{threshold}$ is the reference threshold;

The given local control unit 24 then considers the rate of change of the differential values curve 32 by comparing the sum of an initial differential value $\tilde{\delta}_{COI}^{k}(t_0)$ at an initial start time $t_0$, i.e. the present time, and a rotor speed integral $\int_{t_0}^{t_p} [\omega^k(t) - \omega_{COI}^{k}(t)]dt$ between the initial start time $t_0$, and a future point in time $t_p$, i.e. a future point in time up to which the predicted differential value is of interest, with the predefined reference threshold according to $$\tilde{\delta}_{COI}^{k}(t_0) + \int_{t_0}^{t_p} [\omega^k(t) - \omega_{COI}^{k}(t)]dt \geq \delta_{threshold}$$

where,
$\tilde{\delta}_{COI}^{k}$ is the differential value at the initial start time $t_0$, i.e. the present time; $\omega^k$ is the rotor speed of individual generator k;
$\omega_{COI}^{k}$ is the average rotor speed of the centre of inertia of the remainder of the plurality of generators; and
$\delta_{threshold}$ is the reference threshold.

The given local control unit 24 then predicts the presence of an out-of-step condition 54 if both the foregoing comparisons indicate that the reference threshold $\delta_{threshold}$, which is set at 180°, has been reached, i.e. equalled or exceeded.

In relation to both the foregoing comparisons, the future point in time $t_p$, i.e. the future point in time up to which the predicted differential value is of interest, can be set as required but is not more than a certain period of time, such as 2 to 4 seconds in the future, so as to help ensure that the prediction of an out-of-step condition 54 remains reliable.

What we claim is:

1. A method of predicting the presence of an out-of-step condition in a power system, the power system including a plurality of generators, the method including the steps of:
   (a) obtaining a differential value ($\delta_{COI}^{k}$) between a rotor angle ($\delta_k$) of an individual one of the plurality of generators and an equivalent rotor angle ($\delta_{COI}^{k}$) of the centre of inertia of the remainder of the plurality of generators;
   (b) processing the differential value ($\delta_{COI}^{k}$) to determine whether the differential value ($\delta_{COI}^{k}$) is predicted to reach a predefined reference threshold ($\delta_{threshold}$); and
   (c) predicting the presence of the out-of-step condition in the power system if the differential value ($\delta_{COI}^{k}$) is predicted to reach the predefined reference threshold ($\delta_{threshold}$);
   wherein processing the differential value ($\tilde{\delta}_{COI}^{k}$) to determine whether the differential value ($\tilde{\delta}_{COI}^{k}$) is predicted to exceed a predefined reference threshold ($\delta_{threshold}$) includes:
   (d) detecting the level of fluctuation of obtained differential values ($\tilde{\delta}_{COI}^{k}$);
   (e) fitting the obtained differential values ($\tilde{\delta}_{COI}^{k}$) to a curve if the level of fluctuation exceeds a fluctuation threshold; and
   (f) based at least in part on the fitting the obtained differential values ($\tilde{\delta}_{COI}^{k}$) to the curve, facilitating coordinated operation of the individual one generator of the plurality of generators with the plurality of generators.

2. A method according to claim 1 wherein in step (a) the equivalent rotor angle ($\delta_{COI}^{k}$) of the centre of inertia of the remainder of the plurality of generators is obtained by calculating a rotor angle ($\delta_{COI}$) of the centre of inertia for the whole of the power system and deducing from this the said equivalent rotor angle ($\delta_{COI}^{k}$) by considering the rotor angle ($\delta_k$) of the said individual generator.

3. A method according to claim 2 wherein the rotor angle ($\delta_{COI}$) of the centre of inertia of the whole power system is calculated by a central control unit and thereafter transmitted to a local control unit of each generator, and each local control unit deduces from the calculated rotor angle ($\delta_{COI}$) of the centre of inertia of the whole power system the corresponding said equivalent rotor angle ($\delta_{COI}^{k}$).

4. A method according to claim 3 wherein the central control unit receives time-stamped data from each generator to permit calculation of the rotor angle ($\delta_{COI}$) of the centre of inertia of the whole power system and the calculated rotor angle ($\delta_{COI}$) of the centre of inertia of the whole system is transmitted to the local control unit of each generator with a synchronous time stamp.

5. A method according to claim 1 wherein (d) detecting the level of fluctuation of obtained differential values includes ($\delta_{COI}^k$):
establishing a coefficient of variation ($C_V$); and
determining that the level of fluctuation has exceeded the fluctuation threshold when the coefficient of variation ($C_V$) exceeds a predetermined threshold coefficient value.

6. A method according to claim 5 wherein step (e) of fitting the obtained differential values ($\delta_{COI}^k$) to a curve includes fitting the sampled obtained differential values ($\delta_{COI}^k$) to a curve using a Prony method.

7. A method according to claim 6 wherein using the Prony method includes establishing an oscillation model of the power system having a rank which is determined by trial and error to minimise any error in the curve fitting.

8. The method according to claim 1 wherein (b) processing the differential value ($\delta_{COI}^k$) to determine whether the differential value ($\delta_{COI}^k$) is predicted to exceed a predefined reference threshold additionally ($\delta_{threshold}$) includes:
(f) assessing the stability of obtained differential values ($\delta_{COI}^k$); and
(g) predicting a future shape of the differential values curve if the stability of the obtained differential values ($\delta_{COI}^k$) is decreasing.

9. A method according to claim 8 wherein step (f) of assessing the stability of obtained differential values ($\delta_{COI}^k$) includes:
decomposing each obtained differential value ($\delta_{COI}^k$) into a plurality of exponential polynomials having arbitrary amplitudes ($A_i$), phases ($\theta_i$), frequencies ($f_r$) and decaying factors ($\alpha$); and
determining that the stability of the obtained differential values ($\delta_{COI}^k$) is decreasing if one or more of the decomposed exponential polynomials has a positive decay factor ($\alpha$).

10. A method according to claim 8 wherein step (g) of predicting a future shape of the differential values curve includes:
calculating a predicted trajectory of the differential values ($\delta_{COI}^k$); and
calculating the rate of change of the real-time measured trajectory of the differential values ($\delta_{COI}^k$).

11. A method according to claim 10 wherein the predicted trajectory and rate of change calculations are carried out in respect of differential values ($\delta_{COI}^k$) obtained during a historical period.

12. A method according to claim 10 wherein step (c) of predicting the presence of the out-of-step condition in the power system if the differential value ($\delta_{COI}^k$) is predicted to reach the predefined reference threshold ($\delta_{threshold}$) includes:
comparing a calculated predicted differential value ($\delta_{COI}^k$) at a future point in time ($t_d$) with the predefined reference threshold ($\delta_{threshold}$) according to $$\delta_{COI}^k = \delta_k(t_p) - \delta_{COI}^k(t_p) \geq \delta_{threshold}$$

where,
$\delta_{COI}^k$ is the predicted differential value at future point in time $t_p$;
$\delta_k(t_p)$ is the rotor angle of individual generator k at time $t_p$;
$\delta_{COI}^k(t)$ is the equivalent rotor angle of the centre of inertia of the remainder of the plurality of generators at time $t_p$; and
$\delta_{threshold}$ is the reference threshold;
comparing the sum of an initial differential value ($\delta_{COI}^k(t_p)$) at an initial start time ($t_p$) and a rotor speed integral ($\int_{t_0}^{t_p}[\omega^k(t)-\omega_{COI}^k(t)]dt$) an between the initial start time ($t_p$) and a future point in time ($t_p$) with the predefined reference threshold ($\delta_{threshold}$) according to $$\delta_{COI}^k(t_p) + \int_{t_0}^{t_p}[\omega^k(t)-\omega_{COI}^k(t)]dt \geq \delta_{threshold}$$

where,
$\delta_{COI}^k$ is the differential value at an initial start time $t_0$;
$\omega^k$ is the rotor speed of individual generator k;
$\delta_{COI}^k$ is the average rotor speed of the centre of inertia of the remainder of the plurality of generators;
$t_p$ is the future point in time; and
$\delta_{threshold}$ is the reference threshold; and
predicting the presence of an out-of-step condition if both the foregoing comparisons indicate that the reference threshold ($\delta_{threshold}$) has been reached.

* * * * *